(12) United States Patent
Russell

(10) Patent No.: US 7,128,366 B2
(45) Date of Patent: Oct. 31, 2006

(54) VENTED HEAT SHIELD FOR VEHICLES

(76) Inventor: John David Russell, 28463 Jerry Pl., Saugus, CA (US) 91350

( * ) Notice: Subject to any disclaimer, the term of this patent is extended or adjusted under 35 U.S.C. 154(b) by 0 days.

(21) Appl. No.: 10/947,096

(22) Filed: Sep. 23, 2004

(65) Prior Publication Data

US 2006/0061144 A1   Mar. 23, 2006

(51) Int. Cl.
*B60J 1/20* (2006.01)
(52) U.S. Cl. ...................................... 296/211
(58) Field of Classification Search ................. 296/211
See application file for complete search history.

(56) References Cited

U.S. PATENT DOCUMENTS

| | | | | |
|---|---|---|---|---|
| 2,608,942 A | * | 9/1952 | Smith | 52/3 |
| 3,917,340 A | * | 11/1975 | Aguirre | 296/136.12 |
| 4,068,885 A | * | 1/1978 | Berger | 296/77.1 |
| 4,684,165 A | * | 8/1987 | Becker | 296/136.12 |
| 4,886,696 A | * | 12/1989 | Bainbridge | 428/184 |
| 4,998,768 A | * | 3/1991 | Wu | 296/136.12 |
| 5,029,933 A | * | 7/1991 | Gillem | 296/136.11 |
| 5,038,674 A | * | 8/1991 | Merges | 454/136 |
| 5,039,159 A | * | 8/1991 | Bonner | 296/136.01 |
| 5,057,176 A | * | 10/1991 | Bainbridge | 156/222 |
| 5,261,722 A | * | 11/1993 | Staley et al. | 296/211 |
| 5,405,184 A | * | 4/1995 | Jardin et al. | 296/215 |
| 5,690,376 A | * | 11/1997 | Leidal | 296/99.1 |
| 6,007,899 A | * | 12/1999 | Yoshizawa et al. | 428/192 |
| 6,423,894 B1 | * | 7/2002 | Patz et al. | 136/244 |

* cited by examiner

*Primary Examiner*—Hilary Gutman
(74) *Attorney, Agent, or Firm*—Ying Chen

(57) ABSTRACT

The vented heat shield is a device with a plurality of shapes, materials or colors which prevents sunlight from heating the roof or exposed surface of a vehicle by blocking the sunlight from the roof or exposed surface of the vehicle and creating an air gap allowing the movement of air in the gap to dissipate heat from both the protected surface and the heat shield. The action of blocking the heat from the sun reduces the rate of heat build up inside the vehicle and the air gap provides a means for ambient air flow to dissipating the heat from the protected surfaces of the vehicle and the heat shield. The shield can be permanent or removable. It is intended that the device be functional whether the vehicle is moving or stationary.

2 Claims, 6 Drawing Sheets

PEM self-locking fastener

VENTED HEAT SHIELD FOR VEHICLES

BACKGROUND OF THE INVENTION

The prior art related to devices which shield vehicles from the sun involve various mechanical retracting devices which expand and retract materials which provide shade to the vehicle. Most of these devices are found to be less than practical as they are inconvenient requiring expanding and retracting the devices for parking and using the vehicle. As a result, very few of the devices developed for providing exterior shade to the vehicle have been sold or utilized. As the SUV market has grown, so has the experience of very high heats within the vehicles which reach as high as 150° F. or more. Several devices have been developed to reduce the amount of light entering the vehicle by placing objects inside the windshield area to reflect the light back outside the vehicle. Although this art is somewhat effective, it still leaves a great deal of surface area exposed on the roof of the vehicle to absorb and conduct heat into the vehicle. This same situation of large surface area exposure exists with larger vehicles such as refrigerated trailers. In both cases it is common to see owners of these vehicles struggle to find a parking spot under a tree or other source of shade so as to reduce the amount of exposure to the radiant heat of the sun.

SUMMARY OF THE INVENTION

The invention consists of three main parts: a shield with a plurality of shapes sizes, construction materials and methods, an air gap and a means of mounting so as to achieve an air gap. The shield provides a means of keeping the radiant heat from the sun off of the surface(s) to be protected, the air gap provides a means of cooling both the protected surface and the heat shield and the mounting mechanism provides a means of attaching the shield to the vehicle and creating the air gap between the protected surfaces of the vehicle and the heat shield.

It is an object of this invention to provide a device that conveniently provides shade to the vehicle without the need for repeated deployment for use.

It is also an object of this invention to provide shade in such a way as to augment its cooling effects by providing a means of air flow over protected surfaces generated by natural breezes or movement of the vehicle.

It is an object of this invention to utilize luggage racks or other mounting devices to provide the air gap and support for the vented heat shield.

Another object of this invention is to allow a plurality of shapes, colors, designs and materials to enhance the aerodynamic features of the air gap or provide secondary performance or aesthetic benefits to the vehicle while achieving its primary intended purpose of reducing the rate of heat absorbed by the vehicle from the sun.

DETAILED DESCRIPTION OF THE EMBODIMENTS

The detailed description set forth below in connection with the appended drawings is intended as a description of presently preferred embodiments of the invention and is not intended to represent the only forms in which the present invention may be constructed and/or utilized. The description set forth for the functions and sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Item 1, the vented heat shield itself, can be made of any material which provides protection from the sun directly on the roof or surface to be protected of the vehicle. The material can be flexible or rigid, bullet or bomb proof, rolled, straight, pleaded, slotted or elastic, and can partially or completely cover the top of the roof or surface to be protected of the vehicle. The shield can be molded, formed, rolled or produced by some other means to achieve its intended form and function. The shield can be designed to enhance the aerodynamic features of the air gap or provide secondary performance or aesthetic benefits to the vehicle while achieving its primary intended purpose.

Item 2, the mounting mechanism for the shield can take on various embodiments to achieve the purpose of attaching the shield to the vehicle and providing an air gap. The mounting of the vented heat shield may be permanent or removable to varying degrees.

Item 3, It is intended that the shield be functional whether the vehicle is in motion or stationary.

Descriptions are now made with reference to the drawings.

Figure 1:
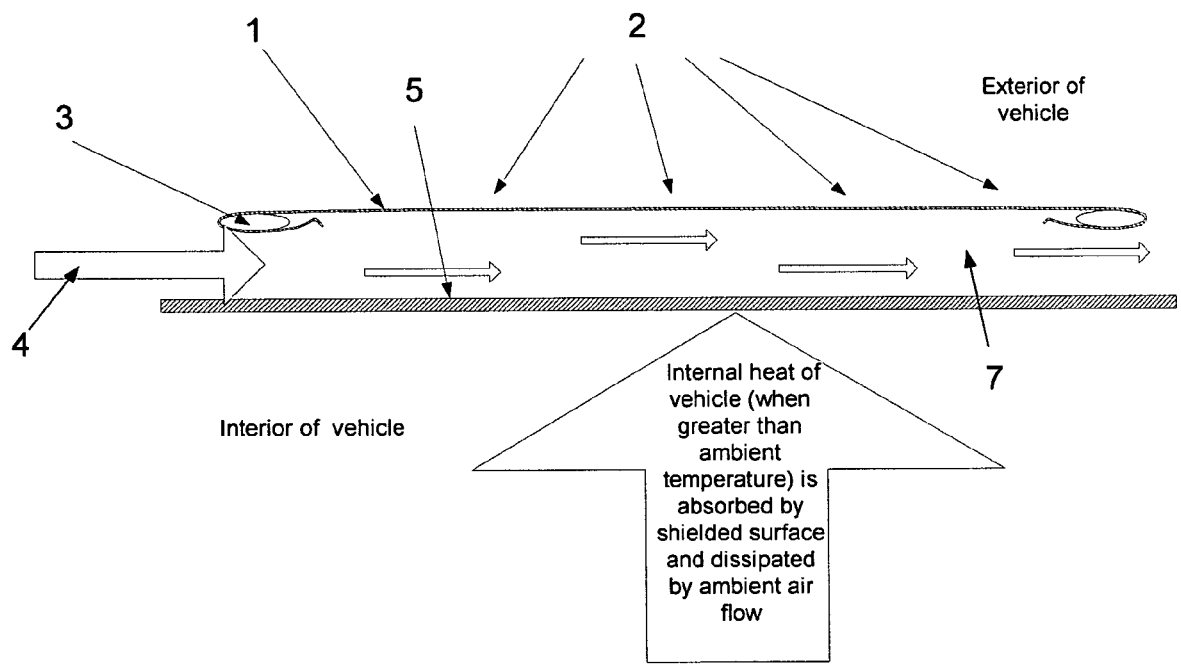
FIG. 1 depicts the heat transfer dynamics of a vented heat shield according to an embodiment of the present invention.

FIG. 1 depicts the heat transfer dynamics of the vented heat shield. Radiant heat from the sun (as indicated by arrows 2) is blocked from being absorbed by the roof or protected surface (5) of the vehicle by the vented heat shield (1). In this embodiment the mounting of the heat shield is mounted to the luggage rack cross members (3) that are common in many SUV's and minivans (see also FIG. 2, which additionally depicts luggage rack rails 8). The vented heat shield is held on the luggage rack cross members by spring tension in the formed ends of the vented heat shield. The luggage rack cross members are adjusted to the maximum limit allowed by the length of the vented heat shield to firmly secure the shield in place. The distance (the air gap 7) between the vented heat shield and the roof or protected surface (5) of the vehicle provides freedom of movement of ambient air (as indicated by the arrow 4) from breezes or movement of the vehicle which dissipates the heat conducted into the air from the protected surface. Since green house effects cause the temperature of the air inside vehicle to easily rise above the ambient air temperature, the ambient air (4) serves to absorb heat from the outer surface of the vehicle roof or protected surface.

Figure 2:
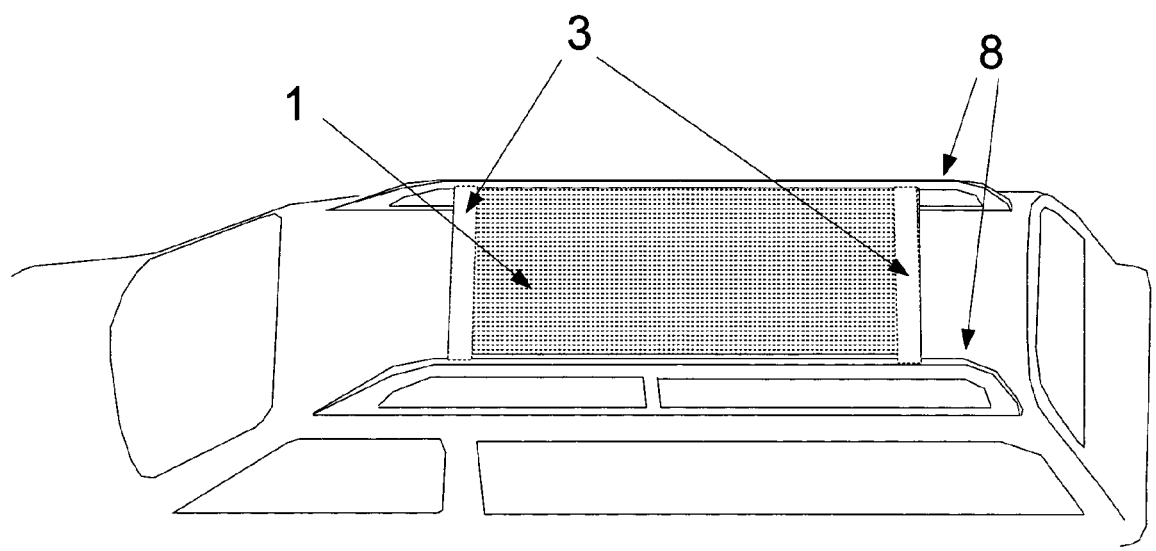
FIG. 2 illustrates a vented heat shield according to embodiments of the present invention as applied to a mini-van luggage rack.
Figure 3:
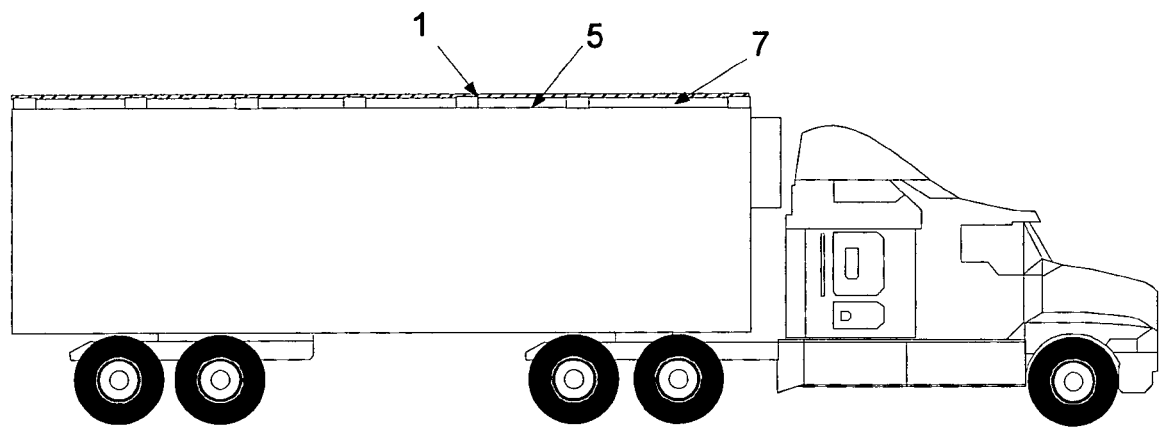
FIG. 3 illustrates a vented heat shield according to embodiments of the present invention as applied to a refrigerated trailer.
Figure 4:
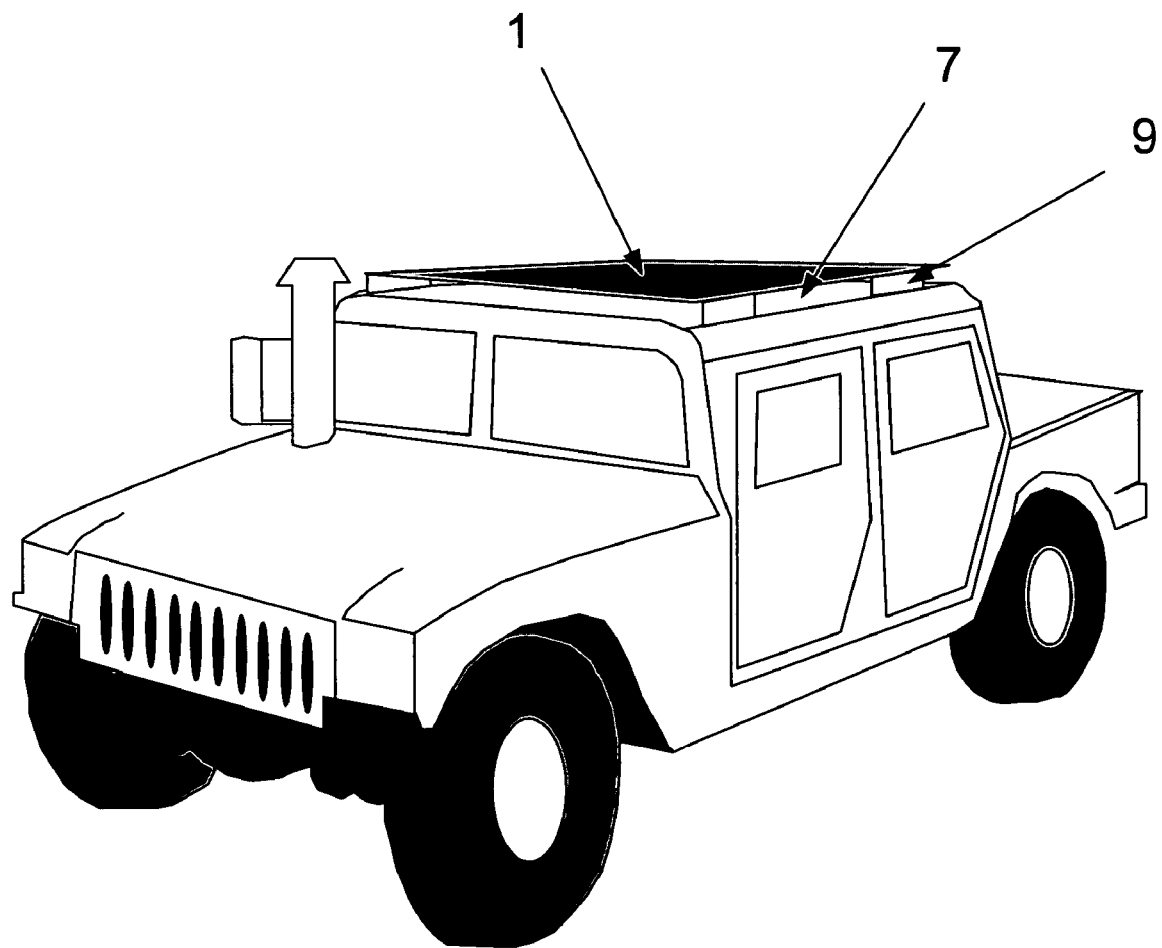
FIG. 4 illustrates a vented heat shield according to embodiments of the present invention as used to enhance performance or aesthetic benefits to the vehicle while functioning to shield sunlight.

FIGS. 2 and 3 depict a vented heat shield as applied to (mounted on) a common minivan luggage rack and a refrigerated trailer, respectively. FIG. 4 illustrates a vented heat shield as used to enhance performance (in this case light armor protection) or aesthetic benefits to the vehicle while achieving its primary intended purpose. The shield 1 may be bomb or bullet-proof. The shield is mounted on a number of mounting supports 8 forming an air gap 7 between the shield 1 and the top of the roof.

Figure 5:
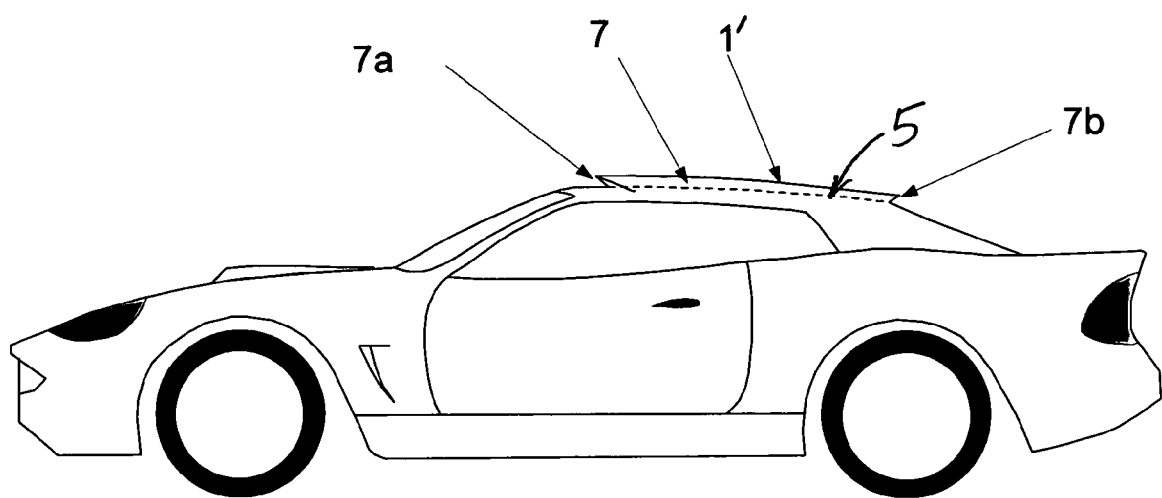
FIG. 5 illustrates an alternate embodiment of the present invention where a vented heat shield is integrated into the structure of the roof of a car.
Figure 6A:
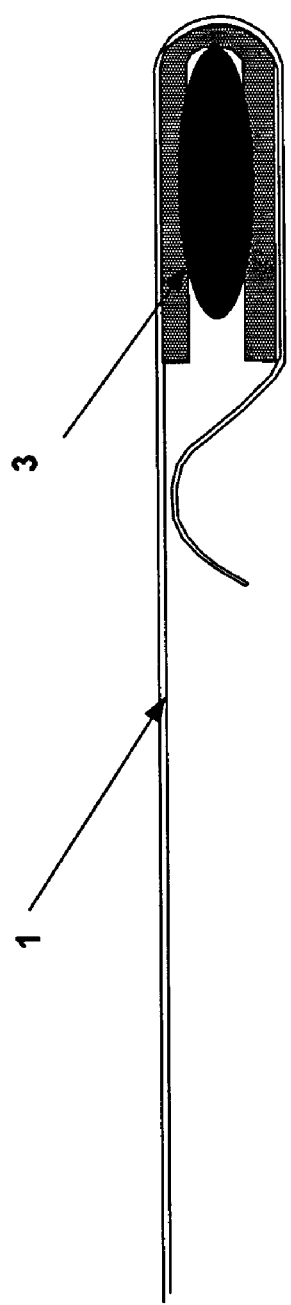
FIGS. 6(a) and 6(b) illustrate a shield being removably mounted and permanently mounted on the cross members of the luggage rack, respectively.
Figure 6B:
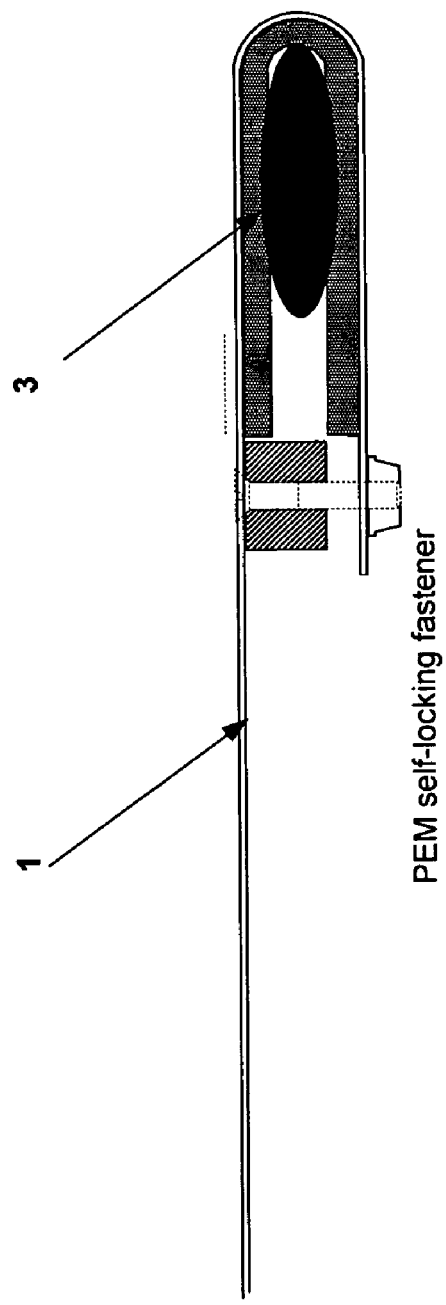

As shown in FIG. 5, as an alternate embodiment, the vented heat shield may also be integrated into the design and structure of the roof of the car. The shield 1 is disposed above the roof portion 5 (which separates the interior and the exterior of the vehicle) and is substantially parallel to the roof portion to define a space 7 between the shield and the roof portion. An air inlet 7a and an air outlet 7b allow air to flow through the space 7. The shield and the roof portion are formed integrally.

What is claimed is:

1. A heat shield for a vehicle with a luggage rack, comprising:
    a shield portion made of a single piece of a rigid material and having a size substantially the same as or smaller than an area defined by the luggage rack of the vehicle; and
    a plurality of mounting portions for mounting the shield portion on the luggage rack with a space defined between the shield portion and a roof surface of the vehicle allowing air flow therethrough, the mounting portions being located at edges of the shield portion such that the mounted shield portion is disposed within the area defined by the luggage rack without substantially protruding therefrom,
    wherein the mounting portions are formed ends of the heat shield and the shield portion is held on cross members of the luggage rack by spring tension in the formed ends.

2. A method of protecting a vehicle from radiant heat, comprising:
    providing a heat shield having a shield portion and a plurality of mounting portions, the shield portion being made of a single piece of a rigid material and having a size substantially the same as or smaller than an area defined by a luggage rack of the vehicle, the mounting portions being located at edges of the shield portion; and
    mounting the heat shield on the luggage rack using the mounting portions such that the mounted shield portion is disposed within the area defined by the luggage rack without substantially protruding therefrom, and such that a space is defined between the shield portion and a roof surface of the vehicle allowing air flow therethrough,
    wherein the mounting portions are formed ends of the heat shield and the shield portion is held on cross members of the luggage rack by spring tension in the formed ends.

* * * * *